(12) United States Patent
Michaels et al.

(10) Patent No.: US 11,770,253 B2
(45) Date of Patent: Sep. 26, 2023

(54) VEHICLE BUS MESSAGE AUTHENTICATION USING WATERMARKING

(71) Applicant: Ford Global Technologies, LLC, Dearborn, MI (US)

(72) Inventors: Alan J. Michaels, Blacksburg, VA (US); James Martin Lawlis, Grosse Pointe Farms, MI (US); Sai Srikar Palukuru, Dearborn, MI (US); John Moore, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 17/220,981

(22) Filed: Apr. 2, 2021

(65) Prior Publication Data

US 2022/0321349 A1    Oct. 6, 2022

(51) Int. Cl.
| | |
|---|---|
| *H04L 29/06* | (2006.01) |
| *H04L 9/32* | (2006.01) |
| *H04B 1/707* | (2011.01) |
| *H04L 12/40* | (2006.01) |
| *H04L 9/00* | (2022.01) |
| *H04L 27/20* | (2006.01) |

(52) U.S. Cl.
CPC .......... *H04L 9/3226* (2013.01); *H04B 1/707* (2013.01); *H04L 9/001* (2013.01); *H04L 12/40* (2013.01); *H04L 27/20* (2013.01); *H04L 2012/40273* (2013.01); *H04L 2209/80* (2013.01); *H04L 2209/84* (2013.01)

(58) Field of Classification Search
CPC ......... H04L 12/40; H04L 27/20; H04L 9/001; H04L 9/3226; H04B 1/707
See application file for complete search history.

(56) References Cited

U.S. PATENT DOCUMENTS

| | | |
|---|---|---|
| 7,797,737 B2 | 9/2010 | Eibach et al. |
| 9,173,100 B2 | 10/2015 | Ricci |
| 9,703,955 B2 | 7/2017 | Yan et al. |
| 9,840,212 B2 | 12/2017 | Ben Noon et al. |
| 10,964,332 B2 * | 3/2021 | Gautama ............... H04M 3/568 |
| 2008/0288566 A1 * | 11/2008 | Umeno .............. H04N 21/2662 708/250 |

(Continued)

OTHER PUBLICATIONS

Stull, R., "Reducing Supply Rail Common Mode Noise in Audio Applications," CUI Inc., Nov. 24, 2020, 9 pages.

*Primary Examiner* — Jeffrey C Pwu
*Assistant Examiner* — Thong P Truong
(74) *Attorney, Agent, or Firm* — Brandon Hicks; Bejin Bieneman PLC

(57) ABSTRACT

An electronic control unit comprises circuitry to receive a combined signal via a vehicle bus of a vehicle, wherein the combined signal contains a combination of a data signal and a watermark signal, which can be a radio frequency (RF) signal or an analog baseband signal, wherein the data signal includes a message, circuitry to extract a watermark from the watermark signal, circuitry to verify the watermark based on a comparison of the watermark with a pre-defined watermark, circuitry to extract the data signal from the combined signal and obtain the message from the data signal, and circuitry to authenticate the message based on the verification of the watermark.

20 Claims, 7 Drawing Sheets

(56) References Cited

U.S. PATENT DOCUMENTS

| | | | |
|---|---|---|---|
| 2011/0184580 A1* | 7/2011 | Kawamoto | H02J 3/14 |
| | | | 700/295 |
| 2012/0194290 A1* | 8/2012 | Wu | H01P 1/2039 |
| | | | 333/246 |
| 2019/0182267 A1 | 6/2019 | Aher et al. | |
| 2019/0385057 A1 | 12/2019 | Litichever et al. | |
| 2020/0003894 A1* | 1/2020 | Giancristofaro | G01S 13/90 |

* cited by examiner

300

400

VEHICLE BUS MESSAGE AUTHENTICATION USING WATERMARKING

BACKGROUND

A modern vehicle, such as an automobile, may contain numerous electronic control units (ECUs) that monitor and control various subsystems of the vehicle, such as the engine, transmission, braking, power steering, cruise control, and so forth. The vehicle may also include a main computer or controller that monitors and controls the various subsystems and ECUs. During normal ongoing operations of the vehicle, the main computer/controller may need to communicate with various subsystems and/or ECUs. Additionally, different subsystems and/or ECUs may need to communicate with/amongst each other. In order to enable such necessary communications, the main computer/controller and the various ECUs of the vehicle may be connected to a vehicle bus, and configured to communicate with each other by transmitting and receiving signals over that vehicle bus.

DETAILED DESCRIPTION

Disclosed herein is an electronic control unit, comprising circuitry to receive a combined signal via a communication bus or network of a vehicle, wherein the combined signal contains a combination of a data signal and a watermark signal, which can be a radio frequency (RF) signal or an analog baseband signal, wherein the data signal includes a message, circuitry to extract a watermark from the watermark signal, circuitry to verify the watermark based on a comparison of the watermark with a pre-defined watermark, circuitry to extract the data signal from the combined signal and obtain the message from the data signal, and circuitry to authenticate the message based on the verification of the watermark.

The data signal may be a differential-mode signal. The watermark signal may be a common-mode signal. The watermark signal may be modulated using direct sequence spread spectrum (DSSS) modulation. Extracting the watermark signal from the combined signal may include de-spreading the watermark signal using a private spreading code.

The watermark signal may be modulated using phase modulation. The phase modulation may be phase-shift keying modulation. The phase-shift keying modulation may be binary phase-shift keying (BPSK).

The watermark signal may be modulated using amplitude modulation or frequency modulation.

The watermark signal may be time-synchronized with the data signal.

Further disclosed herein is a method comprising encoding a message for transmission over a vehicle bus of a vehicle, generating a data signal including the encoded message, generating a watermark signal, which may be a radio frequency (RF) signal or an analog baseband signal, combining the data signal and the watermark signal, to obtain a combined signal, and transmitting the combined signal over the vehicle bus.

The data signal may be a differential-mode signal. The watermark signal may be a common-mode signal.

Combining the data signal and the watermark signal may include time-synchronizing the watermark signal with the data signal.

The method may include modulating the watermark signal using direct sequence spread spectrum (DSSS) modulation. The modulating the watermark signal using DSSS modulation may include spreading the watermark signal into a DSSS sequence using a private spreading code.

The method may include modulating the watermark signal using phase modulation. The phase modulation may be phase-shift keying modulation. The phase-shift keying modulation may be binary phase-shift keying (BPSK).

The watermark signal may be modulated using amplitude modulation or frequency modulation.

Figure 1:
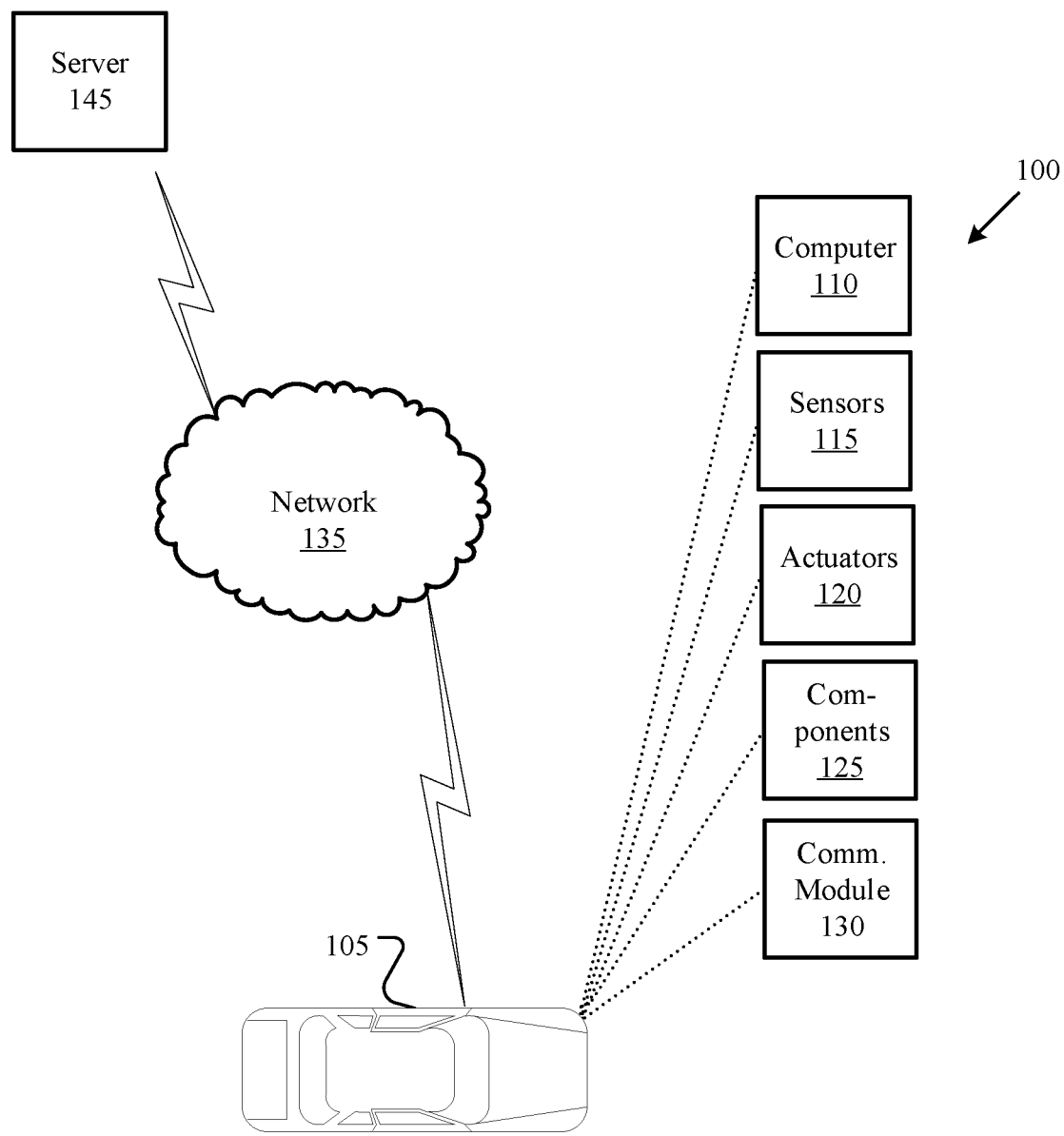
FIG. 1 is a block diagram of an example system including a vehicle.

FIG. 1 is a block diagram of an example vehicle system 100. The system 100 includes a vehicle 105. According to some implementations, vehicle 105 can be a land vehicle such as a car, truck, etc. According to other implementations, vehicle 105 can be an aerial vehicle, such as a fixed-wing aircraft (e.g., an airplane), a rotary-wing aircraft (e.g., a helicopter), or a lighter-than-air aircraft (e.g., an airship). According to yet other implementations, vehicle 105 can be a watercraft (e.g., a ship or a submarine). The vehicle 105 includes a computer 110, vehicle sensors 115, actuators 120 to actuate various vehicle components 125, and a communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via communications module 130 as described further below, more than one processor, e.g., included in electronic control units (ECUs) or the like included in the vehicle 105 for monitoring and/or controlling various vehicle components 125, e.g., a powertrain controller, a brake controller, a steering controller, etc. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

The computer 110 is generally arranged for communications via the vehicle communications module 130 and also via an internal wired and/or wireless network, e.g., a bus or the like in the vehicle 105 such as a controller area network (CAN) or the like, and/or other wired and/or wireless mechanisms. Via such an internal network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the internal network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module 130 with devices outside of the vehicle 105, e.g., through vehicle-to-vehicle (V2V) or vehicle-to-infrastructure (V2X) wireless communications to another vehicle, to (typically via the network 135) a remote server 145. The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC) and cellular V2V (CV2V), cellular V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
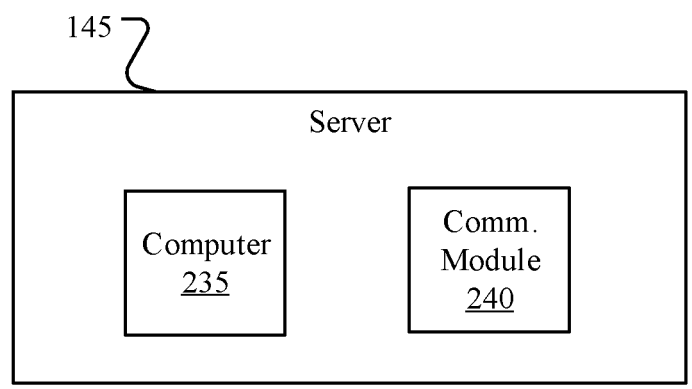
FIG. 2 is a block diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
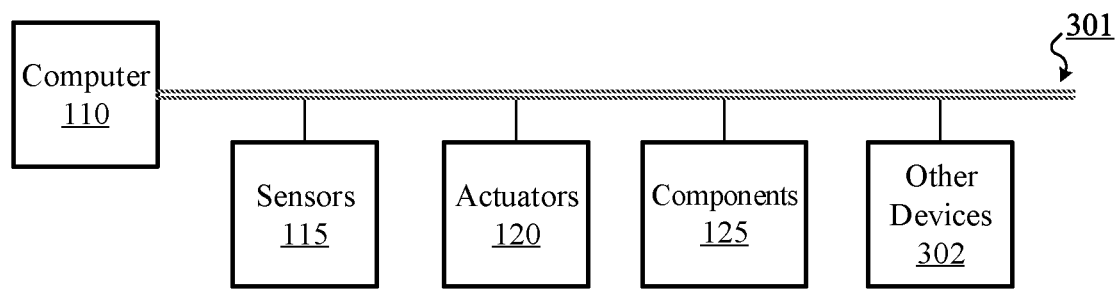
FIG. 3 is a block diagram of an example vehicle network.

FIG. 3 is a block diagram of an example vehicle network 300. Vehicle network 300 may be representative of an internal network via which computer 110 can communicate with one or more other devices in vehicle 105 of FIG. 1 according to various implementations. In some implementations, vehicle network 300 can be a controller area network (CAN). Devices that communicate in vehicle network 300 can include computer 110, sensors 115, actuators 120, and components 125. As reflected in the example depicted in FIG. 3, devices that communicate in vehicle network 300 can also include one or more other devices 302. In various implementations, other devices 302 may include one or more electronic control units (ECUs).

Communication between devices in vehicle network 300 is conducted via signaling over a vehicle bus 301. In various implementations, by transmitting and receiving signals over vehicle bus 301, devices in vehicle network 300 can exchange messages in accordance with one or more defined communication protocols. In some such implementations, differential-mode signaling may be used to convey such messages. In some implementations, vehicle network 300 can be a CAN, vehicle bus 301 can be a CAN bus, and devices in vehicle network 300 can be configured to communicate over vehicle bus 301 in accordance with defined protocols for communications over CAN buses. In other implementations, other protocols can alternatively or additionally be used for communications over vehicle bus 301. Examples of other protocols that may be used for communications over vehicle bus 301 in some implementations include, without limitation, Local Interconnected Network (LIN), Media Oriented System Transport (MOST), Time-Triggered Protocol (TTP), FlexRay, and Automotive Ethernet.

Figure 4:
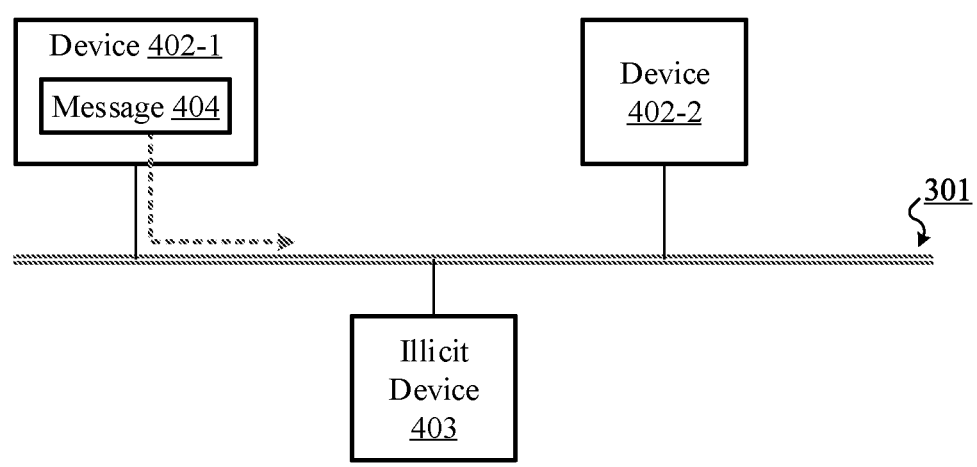
FIG. 4 is a block diagram of a first operating environment.

FIG. 4 illustrates an example of an operating environment 400, in which a device 402-1 and a device 402-2 are connected to—and configured to communicate over—vehicle bus 301. Either or both of devices 402-1 and 402-2 may represent any of the various devices depicted in vehicle network 300 of FIG. 3. Device 402-1 may transmit over vehicle bus 301 signals comprising a message 404 that is addressed to device 402-2. By receiving and processing those signals, device 402-2 may obtain that message 404. Based on information contained in message 404, device 402-2 may identify itself as an/the addressee of message 404, and may identify device 402-1 as the sender of message 404.

In operating environment 400, there may be no way for device 402-2 to verify that the signals comprising message 404 actually originated from the device identified, by information contained in message 404, as the sender of message 404. As such, if an illicit device 403 is connected to vehicle bus 301, it may be possible for that illicit device 403 to, for example, send messages to device 402-2 that appear to be sent by device 402-1 or another device. This vulnerability could potentially be utilized for malicious purposes, in the form of attacks that interfere with the appropriate operations of device 402-2, other devices communicating on vehicle bus 301, and/or other devices, components, or elements within the vehicle containing vehicle bus 301.

One approach to addressing this vulnerability may be to incorporate authorization/security features into the messaging protocol that governs the exchange of messages over vehicle bus 301. However, this may require changes to the structures of such messages, and may increase the amount of overhead associated with conveying them between devices. Additionally, the processing requirements associated with identifying and evaluating authorization/security information in messages on the vehicle bus may impart significant latencies upon potentially time-sensitive communications.

Disclosed herein are authentication techniques that can be implemented in order to address the aforementioned vulnerability, without requiring changes in message structure, size, or contents, and with minimal impact on latency. According to such techniques, devices sending messages over a vehicle bus can generate watermark signals, which can be RF signals or analog baseband signals according to a predefined scheme that is known to legitimate devices in the vehicle network. The watermark signals can be combined at the physical layer with data signals comprising the messages, in such a way as not to interfere with the ability of legacy devices (i.e., devices not possessing watermark extraction and authentication capabilities) to obtain those messages. At the receive side, capable devices can extract the watermarks from the received signals and compare them to pre-defined watermarks in order to authenticate the messages contained in the received signals.

Figure 5:
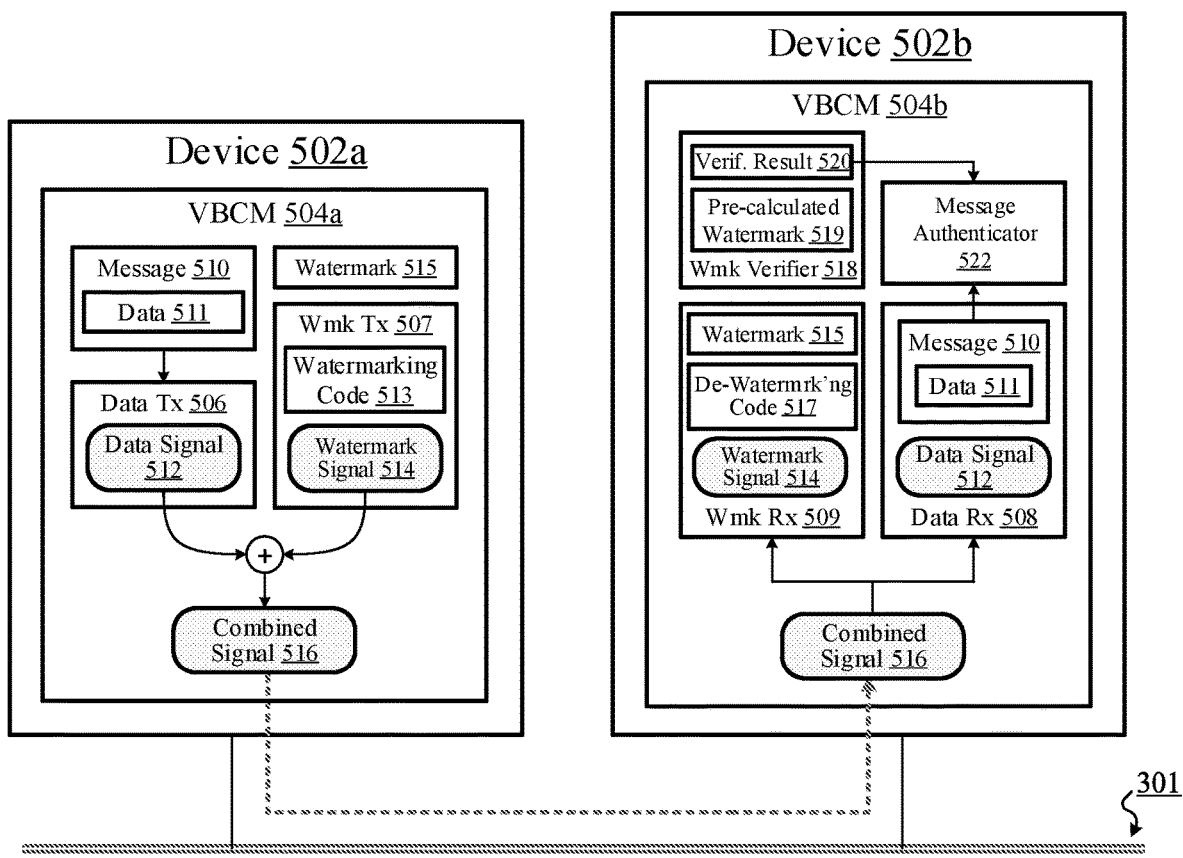
FIG. 5 is a block diagram of a second operating environment.

FIG. 5 illustrates an example of an operating environment 500, in which a device 502a and a device 502b are configured to implement watermarking techniques in conjunction with communicating over vehicle bus 301. Devices 502a and 502b include respective vehicle bus communication modules (VBCMs) 504a and 504b. VBCMs 504a and 504b generally comprise appropriate circuitry, logic, and/or instructions to support communications with other devices via vehicle bus 301, including the implementation of watermarking techniques in conjunction with such communications.

Operations that VBCMs 504a and 504b may perform in conjunction with transmitting data over vehicle bus 301 can include identifying data to be sent to other devices, constructing messages including payloads containing such data, performing encoding and modulation to generate data signals containing such messages, generating watermark signals (e.g., RF watermark signals or analog baseband watermark signals), combining the watermark signals with the data signals, and transmitting the combined signals over vehicle bus 301. In operating environment 500, VBCM 504a includes data transmitter (Tx) 506 and watermark transmitter (Tx) 507. Data transmitter 506 can generally perform operations associated with generation and transmission of data signals, and watermark transmitter 507 can generally perform operations associated with generation and transmission of watermark signals.

Operations that VBCMs 504a and 504b may perform in conjunction with receiving data via vehicle bus 301 can include receiving combined signals via vehicle bus 301, extracting data signals and watermark signals (e.g., RF watermark signals or analog baseband watermark signals) from the combined signals, authenticating the data signals based on the watermark signals, performing demodulation and decoding to obtain messages contained in the data signals, and obtaining data from payloads of the messages. In operating environment 500, VBCM 504b includes data receiver (Rx) 508 and watermark receiver (Rx) 509. Data receiver 508 can generally perform operations associated with receipt and processing of data signals, and watermark receiver 509 can generally perform operations associated with receipt and processing of watermark signals.

In some implementations, device 502a may correspond to computer 110 of vehicle 105, and device 502b may represent an ECU of vehicle 105. In other implementations, device 502a may represent an ECU of vehicle 105, and device 502b may correspond to computer 110. In yet other implementations, one of device 502a and 502b may correspond to computer 110, and the other may represent another element of vehicle 105, such as a sensor 115, an actuator 120, or a component 125. In still other implementations, neither of devices 502a and 502b may correspond to computer 110, and both may represent other elements of vehicle 105. For example, according to some implementations, devices 502a and 502b may both represent ECUs of vehicle 105.

In order to send data 511 to device 502b, VBCM 504a can construct a message 510 that contains data 511. In some implementations, data 511 may be contained in a payload of message 510. In implementations in which communications over vehicle bus 301 are conducted according to CAN bus protocols, message 510 may be a CAN message frame, such as a data frame, a remote frame, an error frame, or an overload frame. Data transmitter 506 can then perform encoding and modulation based on message 510 to generate a data signal 512 that contains message 510. According to various implementations, data signal 512 can be a differential mode signal.

In order to implement watermarking of message 510, watermark transmitter 507 can generate a watermark signal 514 that conveys a watermark 515. In some implementations, watermark signal 514 can be an RF signal. In some implementations, watermark signal 514 can be an analog baseband signal. According to various implementations, watermark signal 514 can be a common mode signal. In some implementations, watermark transmitter 507 can modulate watermark signal 514 using direct sequence spread spectrum (DSSS). According to various implementations, watermark transmitter 507 can generate watermark signal 514 based on a watermarking code 513. Watermarking code 513 can be a private/confidential code preconfigured in VBCM 504a and/or device 502a. In some implementations, watermarking code 513 can be a spreading code, and watermark transmitter 507 can use watermarking code 513 to spread watermark 515 into a DSSS sequence in order to obtain watermark signal 514.

In some implementations, watermark transmitter 507 can modulate watermark signal 514 using phase modulation. In some implementations, for example, watermark transmitter 507 can modulate watermark signal 514 using phase-shift keying (PSK), such as binary PSK (BPSK), or a higher-order PSK such as quadrature PSK (QPSK) or 8-PSK. In some implementations, watermark transmitter 507 can generate watermark signal 514 as an arbitrary-phase spread spectrum waveform, such as a high-order PSK signaling (HOPS) spread spectrum waveform, or a digital chaotic sequence spread spectrum (CSSS) waveform.

In some implementations, watermark transmitter 507 can modulate watermark signal 514 using amplitude modulation or frequency modulation.

VBCM 504a can combine data signal 512 and watermark signal 514 to obtain combined signal 516. In this context, watermark signal 514 can be injected into data signal 512 as an co-channel underlay signal that appears to be simply noise or interference. In conjunction with combining data signal 512 and watermark signal 514, VBCM 504a can time-synchronize and frequency-align data signal 512 and watermark signal 514. VBCM 504a can transmit combined signal 516 over vehicle bus 301.

At device 502b, VBCM 504b can receive combined signal 516 from device 502a via vehicle bus 301. Watermark receiver 509 can process combined signal 516 in order to extract watermark signal 514 from combined signal 516. According to various implementations, watermark receiver 509 can use a de-watermarking code 517 to extract watermark 515 from watermark signal 514. In some implementations, de-watermarking code 517 may be a same code as watermarking code 513. In other implementations, de-watermarking code 517 may differ from watermarking code 513. In various implementations, de-watermarking code 517 can be a de-spreading code, and watermark receiver 509 can use de-watermarking code 517 to de-spread watermark 515 from a DSSS sequence conveyed by watermark signal 514.

As shown in FIG. 5, VBCM 504b can include an watermark verifier 518. Watermark verifier 518 can verify watermarks conveyed in signals received via vehicle bus 301, such as the watermark 515 extracted by watermark receiver 509. In order to verify watermark 515, watermark verifier 518 can compare watermark 515 with a pre-calculated watermark 519. Watermark verifier 518 can be configured to determine that verification of watermark 515 is successful when watermark 515 matches pre-calculated watermark 519, or when a correlation between watermark 515 and pre-calculated watermark 519 is above a threshold. Watermark verifier 518 can be configured to determine that verification of watermark 515 is unsuccessful when watermark 515 does not match pre-calculated watermark 519, or when a correlation between watermark 515 and pre-calculated watermark 519 is not above a threshold.

As shown in FIG. 5, VBCM 504b can include a message authenticator 522. Message authenticator 522 can authenticate messages received at device 502b via vehicle bus 301, such as message 510. Watermark verifier 518 can send a verification result 520 to message authenticator 522 that indicates whether verification of watermark 515 was successful or unsuccessful. Message authenticator 522 can authenticate message 510 (e.g., classify it as a trusted message) when verification result 520 indicates that verification of watermark 515 was successful. Message authenticator 522 can decline to authenticate message 510 (e.g., classify it as an untrusted message) when verification result 520 indicates that verification of watermark 515 was unsuccessful.

In some implementations, device 502a can be configured to construct watermark 515 dynamically. In some implementations, for example, device 502a can dynamically construct watermark 515 based on one or more cryptographic keys, measures of time, selections of network subnets, or a combination thereof and/or substantially similar information. According to some implementations, device 502a can be configured to dynamically construct watermarks (such as watermark 515) on a recurring basis in order to secure its communications via vehicle bus 301 over time. In some implementations, each such watermark may differ from each previously-used watermark. In some implementations, such non-repeating watermarks may be achieved via a scheme in which the watermarks are generated based on time-varying parameters. In various implementations, the use of non-repeating watermarks can provide communications over vehicle bus 301 with resilience against spoofing attacks.

Figure 6:
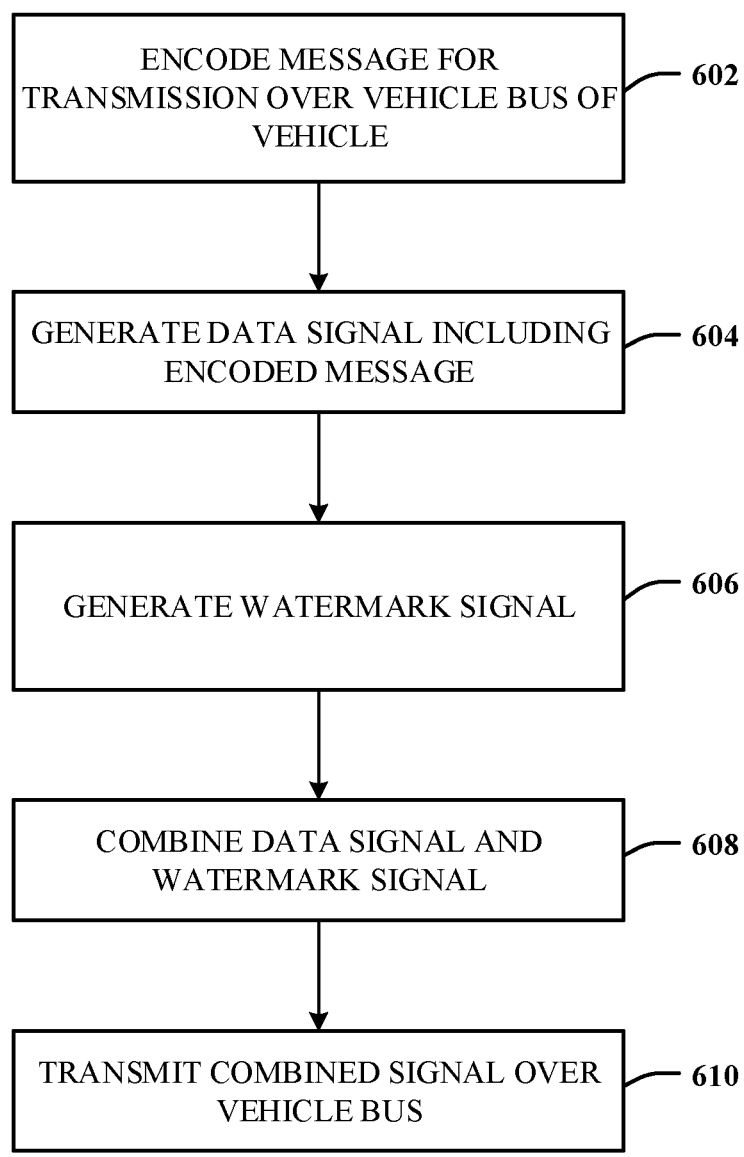
FIG. 6 is a block diagram of a first logic flow.

FIG. 6 is a block diagram of a logic flow 600, which may be representative of operations executed in various implementations. As shown in logic flow 600, a message may be encoded for transmission over a vehicle bus of a vehicle at 602. For example, in operating environment 500 of FIG. 5, device 502a may use VBCM 504a to encode message 510 for transmission over vehicle bus 301. At 604, a data signal may be generated that includes the encoded message. For example, in operating environment 500 of FIG. 5, device 502a may use VBCM 504a to generate data signal 512, which may include the encoded message 510 obtained at 602.

At 606, a watermark signal may be generated. For example, in operating environment 500 of FIG. 5, device 502a may use VBCM 504a to generate watermark signal 514. In some implementations, the watermark signal can convey a dynamically-generated watermark. For example, in operating environment 500 of FIG. 5, device 502a may use VBCM 504a to dynamically construct the watermark 515 based on one or more cryptographic keys, measures of time, selections of network subnets, or a combination thereof and/or substantially similar information, and may generate the watermark signal 514 that conveys that watermark 515. At 608, the data signal generated at 604 and the watermark signal generated at 606 may be combined, to obtain a combined signal. For example, in operating environment 500 of FIG. 5, device 502a may use VBCM 504a to combine data signal 512 and watermark signal 514, and thus obtain combined signal 516. At 610, the combined signal obtained at 608 may be transmitted over the vehicle bus. For example, in operating environment 500 of FIG. 5, device 502a may use VBCM 504a to transmit combined signal 516 over vehicle bus 301.

Figure 7:
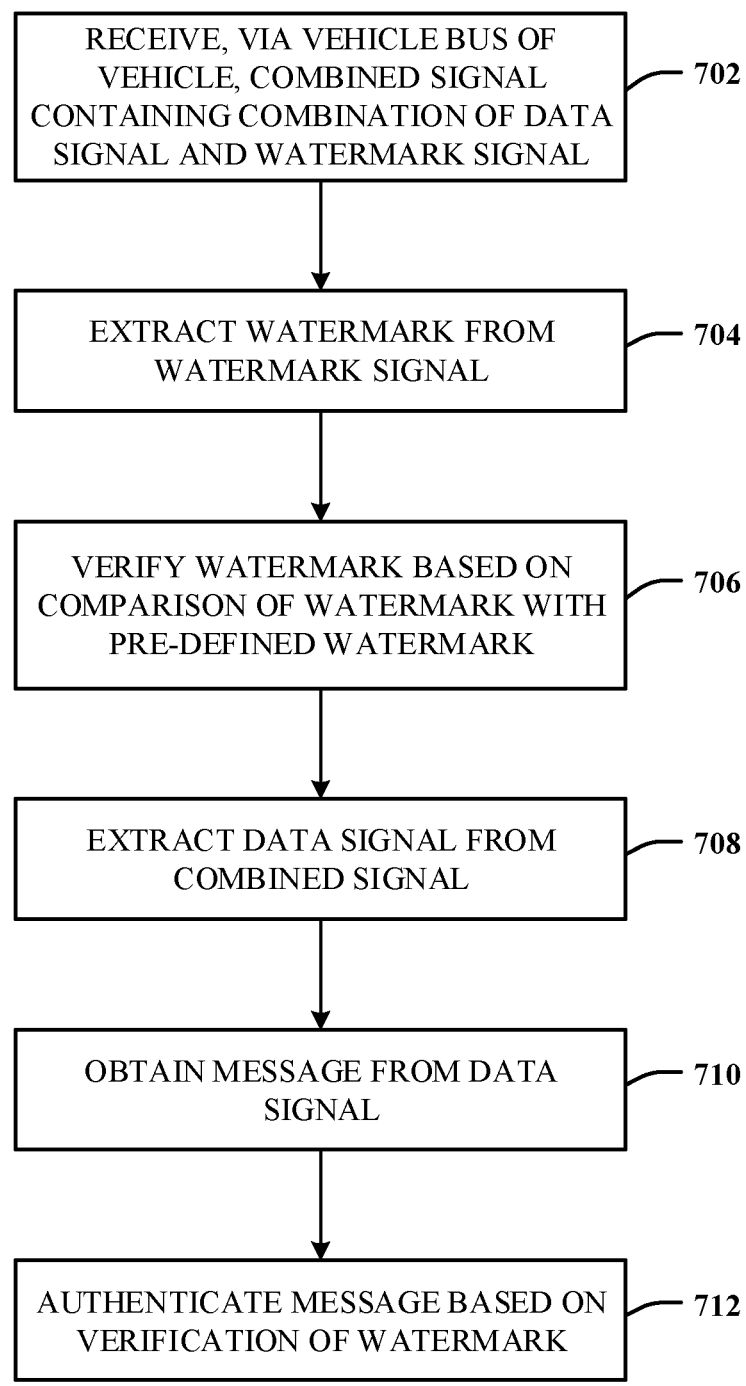
FIG. 7 is a block diagram of a second logic flow.

FIG. 7 is a block diagram of a logic flow 700, which may be representative of operations executed in various implementations. As shown in logic flow 700, a combined signal may be received via a vehicle bus of a vehicle at 702, and the combined signal may contain a combination of a data signal and a watermark signal. For example, in operating environment 500 of FIG. 5, device 502b may use VBCM 504b to receive combined signal 516 via vehicle bus 301, and combined signal 516 may contain a combination of data signal 512 and watermark signal 514. At 704, a watermark may be extracted from the watermark signal. For example, in operating environment 500 of FIG. 5, device 502b may use VBCM 504b to extract watermark 515 from watermark signal 514. At 706, the watermark extracted at 704 may be verified based on a comparison of that watermark with a pre-defined watermark. For example, in operating environment 500 of FIG. 5, device 502b may use VBCM 504b to verify watermark 515 based on a comparison of watermark 515 with pre-calculated watermark 519.

At 708, a data signal may be extracted from the combined signal. For example, in operating environment 500 of FIG. 5, device 502b may use VBCM 504b to extract data signal 512 from combined signal 516. At 710, a message may be obtained from the data signal. For example, in operating environment 500 of FIG. 5, device 502b may use VBCM 504b to obtain message 510 from data signal 512. At 712, the message obtained at 710 may be authenticated based on the verification at 706 of the watermark extracted at 704. For example, in operating environment 500 of FIG. 5, device 502b may use VBCM 504b to authenticate message 510 based on the verification of watermark 515.

Figure 8:
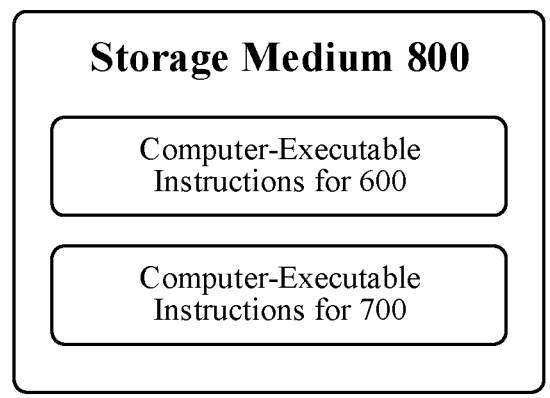
FIG. 8 is a block diagram of a storage medium.

FIG. 8 illustrates an example storage medium 800. Storage medium 800 may be any non-transitory computer-readable storage medium or machine-readable storage medium, such as an optical, magnetic or semiconductor storage medium. In various implementations, storage medium 800 may be an article of manufacture. In some implementations, storage medium 800 may store computer-executable instructions, such as computer-executable instructions to implement logic flow 600 of FIG. 6, computer-executable instructions to implement logic flow 700 of FIG. 7, or both. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. An electronic control unit, comprising:
    circuitry to receive a combined signal via a vehicle bus of a vehicle, wherein the combined signal contains a combination of a data signal and a watermark signal, wherein the data signal includes a message, wherein the data signal is a differential-mode signal;
    circuitry to extract the data signal from the combined signal and obtain the message from the data signal;
    circuitry to extract a watermark from the watermark signal, wherein the watermark signal is a common-mode signal;
    circuitry to verify the watermark based on a comparison of the watermark with a pre-defined watermark; and
    circuitry to send a verification result to cause authentication of the message based on the verification of the watermark.

2. The electronic control unit of claim 1, wherein the watermark signal is a radio frequency (RF) signal.

3. The electronic control unit of claim 1, wherein the watermark signal is an analog baseband signal.

4. The electronic control unit of claim 1, wherein the watermark signal is modulated using direct sequence spread spectrum (DSSS) modulation.

5. The electronic control unit of claim 4, further comprising circuitry to extract the watermark signal from the combined signal, wherein extracting the watermark signal from the combined signal includes de-spreading the watermark signal using a private spreading code.

6. The electronic control unit of claim 1, wherein the watermark signal is modulated using binary phase-shift keying (BPSK) modulation, quadrature phase-shift keying (QPSK), or 8-phase-shift keying (8-PSK) modulation.

7. The electronic control unit of claim 1, wherein the watermark signal is a high-order phase-shift keying (PSK) signaling (HOPS) waveform or a chaotic sequence spread spectrum (CSSS) waveform.

8. The electronic control unit of claim 1, wherein the watermark signal is time-synchronized with the data signal.

9. A method, comprising:
    encoding a message for transmission over a vehicle bus of a vehicle;
    generating a data signal including the encoded message;
    generating a watermark signal, wherein the watermark signal conveys a watermark, and wherein the data signal is a differential-mode signal, and wherein the watermark signal is a common-mode signal;
    combining the data signal and the watermark signal, to obtain a combined signal; and
    transmitting the combined signal over the vehicle bus.

10. The method of claim 9, comprising dynamically generating the watermark based on at least one of:
    one or more cryptographic keys;

one or more measures of time; and a selection of a network subnet.

11. The method of claim 9, wherein combining the data signal and the watermark signal includes time-synchronizing the watermark signal with the data signal.

12. The method of claim 9, comprising modulating the watermark signal using direct sequence spread spectrum (DSSS) modulation, including spreading the watermark signal into a DSSS sequence using a private spreading code.

13. The method of claim 9, comprising modulating the watermark signal using binary phase-shift keying (BPSK) modulation, quadrature phase-shift keying (QPSK) modulation, or 8-phase-shift keying (8-PSK) modulation.

14. The method of claim 9, wherein the watermark signal is a high-order phase-shift keying (PSK) signaling (HOPS) waveform or a chaotic sequence spread spectrum (CSSS) waveform.

15. The method of claim 9, wherein the watermark signal is an analog baseband signal.

16. An electronic control unit, comprising:
  circuitry to receive a combined signal via a vehicle bus of a vehicle, wherein the combined signal contains a combination of a data signal and a watermark signal, wherein the data signal includes a message, wherein the data signal is a differential-mode signal;
  circuitry to extract the data signal from the combined signal and obtain the message from the data signal;
  circuitry to extract a watermark from the watermark signal;
  circuitry to verify the watermark based on a comparison of the watermark with a pre-defined watermark; and
  circuitry to send a verification result to cause authentication of the message based on the verification of the watermark.

17. The electronic control unit of claim 16, wherein the watermark signal is a baseband signal.

18. The electronic control unit of claim 16, wherein the watermark signal is modulated using direct sequence spread spectrum (DSSS) modulation.

19. The electronic control unit of claim 16, wherein the watermark signal is modulated using binary phase-shift keying (BPSK) modulation, quadrature phase-shift keying (QPSK), or 8-phase-shift keying (8-PSK) modulation.

20. The electronic control unit of claim 16, wherein the watermark signal is a high-order phase-shift keying (PSK) signaling (HOPS) waveform or a chaotic sequence spread spectrum (CSSS) waveform.

\* \* \* \* \*